United States Patent [19]

Suzuki et al.

[11] 4,434,464
[45] Feb. 28, 1984

[54] MEMORY PROTECTION SYSTEM FOR EFFECTING ALTERATION OF PROTECTION INFORMATION WITHOUT INTERVENTION OF CONTROL PROGRAM

[75] Inventors: Hitoshi Suzuki, Owariasahi; Shigekatsu Takahashi, Ayase; Yoshiki Fujioka, Owariasahi, all of Japan

[73] Assignee: Hitachi, Ltd., Tokyo, Japan

[21] Appl. No.: 249,500

[22] Filed: Mar. 31, 1981

[30] Foreign Application Priority Data

Apr. 1, 1980 [JP] Japan .................................. 55-42126

[51] Int. Cl.³ .............................................. G06F 9/46
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,377,624 | 4/1968 | Nelson et al. | 364/200 |
| 3,576,544 | 4/1971 | Cordero et al. | 364/200 |
| 3,699,532 | 10/1972 | Schaffer et al. | 364/200 |
| 3,916,385 | 10/1975 | Parmar et al. | 364/200 |
| 3,978,454 | 8/1976 | Willard | 364/900 |
| 4,118,789 | 10/1978 | Casto | 364/900 |

Primary Examiner—Harvey E. Springborn
Attorney, Agent, or Firm—Antonelli, Terry & Wands

[57] ABSTRACT

In a memory protection system for a computer, memory protection information provided for each of the memory areas of a memory and memory protection information provided for each of the programs executed by a processor are collated to determine allowance/inhibition of access to the memory. By detecting that an instruction to be executed is an instruction having a particular operation and that an address of the memory to be accessed by the instruction is a particular address, the memory protection information for the program executed by the processor is altered to allow the memory access. The alteration of memory protection information is carried out with no intervention of a control program.

12 Claims, 11 Drawing Figures

MEMORY PROTECTION SYSTEM FOR EFFECTING ALTERATION OF PROTECTION INFORMATION WITHOUT INTERVENTION OF CONTROL PROGRAM

BACKGROUND OF THE INVENTION

The present invention relates to a memory protection system, and more particularly to a memory protection system for use in a data processing system including a main memory having a plurality of memory areas and a program implemented processor for effecting access to the main memory.

Methods for preventing data in a memory from being altered due to erroneous access to the memory are roughly grouped into a key scheme and a segment scheme. The key scheme will first be explained. In the key scheme, at the central processing unit (hereinafter referred to as CPU) of an electronic computer are provided an address register for holding an address of a memory location to be accessed (that is, a memory address to be accessed) and a program key associated with a program making the access. On the other hand, the memory is divided into a plurality of blocks A, B, C and so on, and memory keys KA, KB, KC and so on are associated with the respective memory blocks. When access to the memory is desired, a memory key associated with a block to be accessed is obtained in response to the address indication from the address register and this memory key is then compared with the above-mentioned program key. Access to the memory is allowed or inhibited depending on whether or not the memory key and the program key coincide. Examples of such a key scheme are disclosed in, for example, U.S. Pat. No. 3,377,624 and U.S. Pat. No. 3,576,544.

In the segment scheme, an address register for holding an address of a memory location to be accessed (that is, a memory address to be accessed) and registers for storing respectively a boundary address and the size associated with a program making the access are provided at the CPU. The stored boundary address represents the beginning address of a memory area accessible by the associated program and the stored size indicates the dimension or size of that memory area. When access to the memory is desired, it is tested whether or not the memory address held by the address register exists within the memory area specified by the boundary address and the size. A protective operation is performed on the basis of the results of such test. If the address indicated by the address register exists in the memory area indicated by the boundary address and the size, the access is allowed. On the other hand, when the memory address exists outside the indicated memory area, the access address is inhibited.

Many data processing systems frequently are required to provide various additional and/or new functions after having been placed on the market. When it is desired to expand a memory protection function, a new fundamental structure may be sometimes required depending upon the desired protection function. Thus, there arises a serious problem that the compatibility between originally prepared programs and newly prepared programs cannot be expected. In order to solve this problem, a recent data processing system has an operation mode called the mode of compatibility with the originally intended system. In more detail, an identifier is provided in a program status word (PSW) of the CPU and it is altered by use of an instruction for changing the contents of the PSW (for example, a PSW load instruction) to change over the operation mode of the whole data processing system, thereby effectively keeping a program intended for the original system. In this case, control programs are prepared for the originally intended mode of system operation and newly desired modes, respectively, so that the system can operate in either one of these modes, and a program for changing over these operation modes is also prepared. However, the instruction for changing the contents of the PSW is a special instruction, generally called a privileged instruction, and only a control program can issue such an instruction. Accordingly, when the identifier is altered on the basis of an ordinary processing program, the processing program has to be linked with the control program, which requires a lot of program overhead. In the case where it is desired to expand the memory protection function for providing more dependable memory protection, the problem of program overhead becomes very serious. Further, since a special instruction is required to alter the identifier, it is sometimes necessary to change a part of the originally prepared program. Especially, when the originally prepared program is employed under the expanded memory protection function, the instruction for changing the contents of the PSW or a process for effecting communication between the control program and the processing program must be additionally inserted into the originally prepared program, which is in fact impossible.

SUMMARY OF THE INVENTION

An object of the present invention, in view of the above problems, is to provide a memory protection system in which memory protection information can be readily altered with no intervention of a control program.

Briefly, and according to the present invention, a certain address is stored. When a predetermined instruction requiring access to the memory, among programs processed by the CPU, is executed, it is detected that a predetermined relation exists between the stored address and the memory address to be accessed by the predetermined instruction. In response to the results of such detection, the memory protection information is altered.

BRIEF DESCRIPTION OF THE DRAWINGS

FIG. 6b shows an address comparison circuit arrangement suitable for the example shown in FIG. 6a;

FIG. 7b shows an address comparison circuit arrangement suitable for the example shown in FIG. 7a;

FIG. 8b shows an address comparison circuit arrangement suitable for the example shown in FIG. 8a.

DESCRIPTION OF THE PREFERRED EMBODIMENTS

Figure 1:
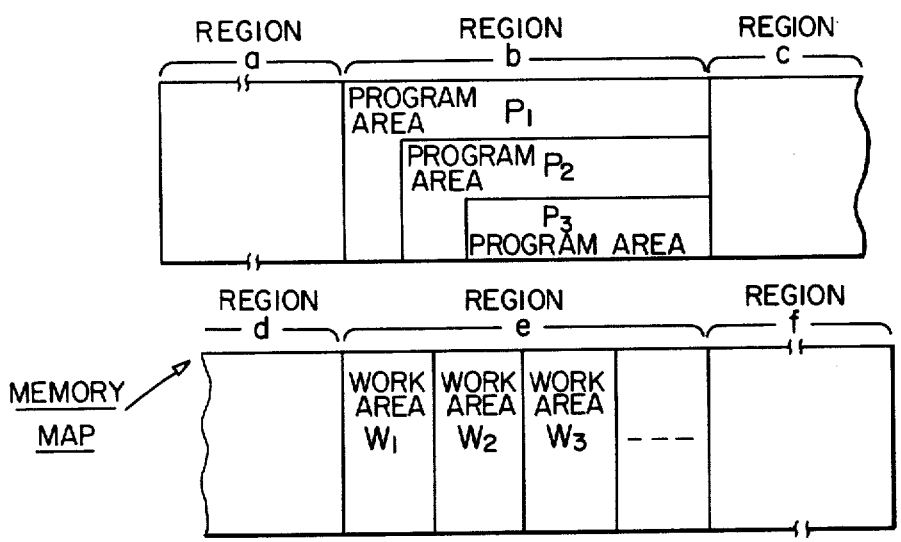
FIG. 1 shows a memory map useful in explaining the present invention.

FIG. 1 shows a memory map illustrating the utilization of a memory. Referring to FIG. 1, the memory is divided into a plurality of regions a, b, c, d, e and f which are used for different processes, respectively. For example, the region a is used for an on-line application program, the region b for a batch processing program, and the region c for a conversational terminal control program. Each of these region is herein referred to as a "subsystem". One of the regions, for example, the region e may include an assembly of work areas $W_1$, $W_2$, $W_3$ and so on which are used as buffer areas for other subsystems. A subsystem includes a plurality of programs. For example, the region b includes a plurality of program areas $P_1$, $P_2$, $P_3$, ... as shown. These program areas are provided for a program for linking with a control program or supervisor of the system, a program for data managing, an application program or user program for application processing, etc.

Figure 2:
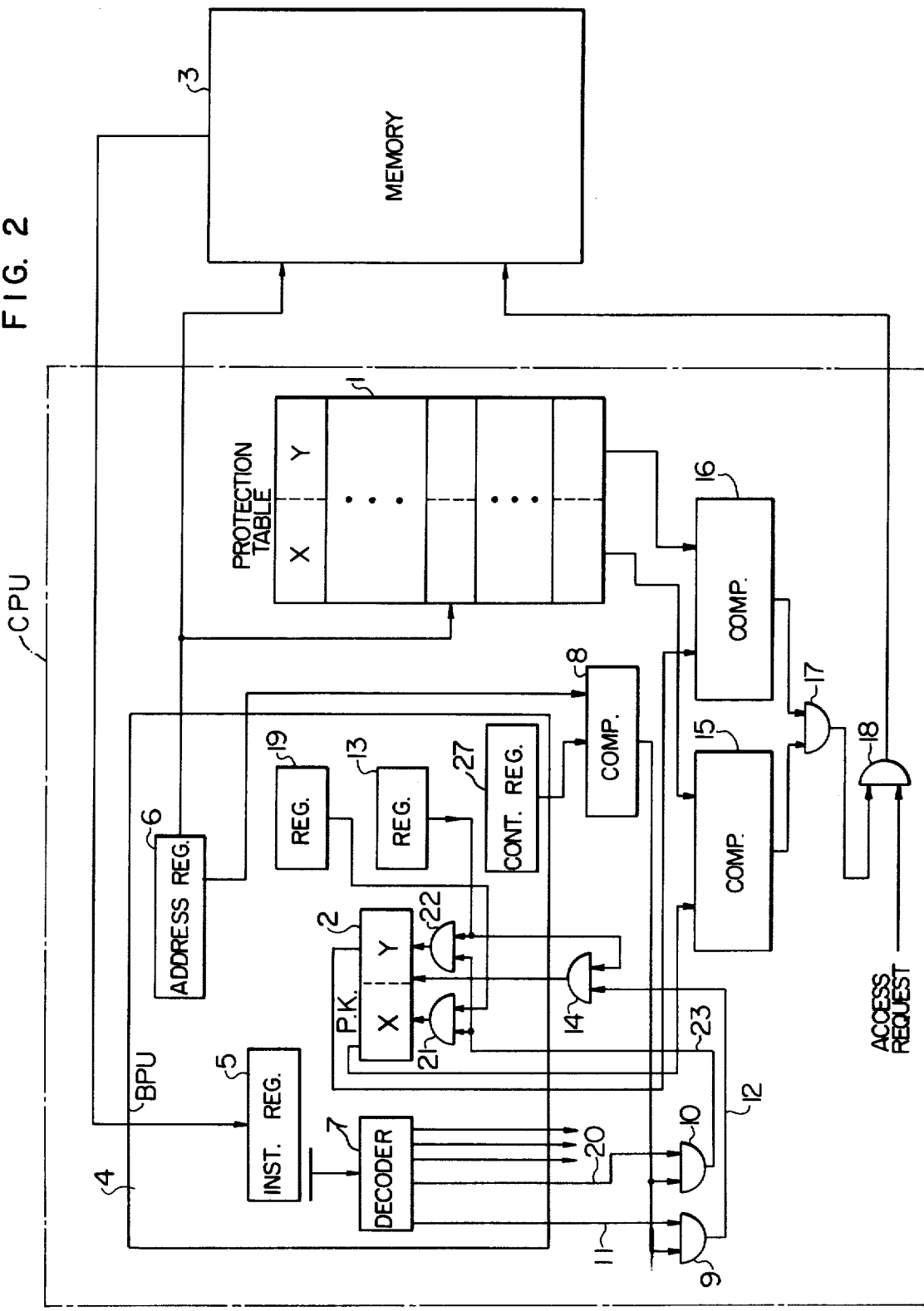
FIG. 2 shows a circuit diagram of a memory protection system according to an embodiment of the present invention.

FIG. 2 shows a memory protection system according to an embodiment of the present invention. In FIG. 2, reference numeral 1 designates a table which stores memory protection information provided in correspondence to the respective memory areas, and numeral 2 identifies a register which stores memory protection information corresponding to respective programs to be executed by the processor. Now, explanation will be made of the memory protection information employed in the present embodiment.

Let us assume that the utilization of the memory as shown in FIG. 1 is employed. Then, a peculiar memory key is allotted to each of the subsystems a, b, c and so on. For example, the memory keys "0", "1" and "2" are assigned to the subsystems a, b and c respectively. For programs within each subsystem, it may be established that a control program can access the areas $P_1$, $P_2$ and $P_3$ and a user program can access only the areas $P_2$ and $P_3$. In the present example, therefore, memory keys "0", "1" and "2" are given as protection information to the areas $P_1$, $P_2$ and $P_3$, respectively, while program keys "0" and "1" are given to the control program and the user program respectively. A program key indicating one subsystem is also provided for each program. By allowing access of a program to the memory when the program key in that program indicating a certain memory subsystem coincides with the memory key allotted to the subsystem and the key given to the program for areas in the subsystem is smaller than or equal to the key given to the memory for areas in the subsystem, the above-required memory protection can be realized.

The protection information for each subsystem and that for each subsystem area are hereinafter referred to as X and Y, respectively. The above-mentioned memory protection can be also made in such a manner that keys "2", "1" and "0" are given to the areas $P_1$, $P_2$ and $P_3$ in a subsystem, respectively, and that access is allowed when the key given to a program is greater than or equal to the keys given to the area in a subsystem.

Figure 4:
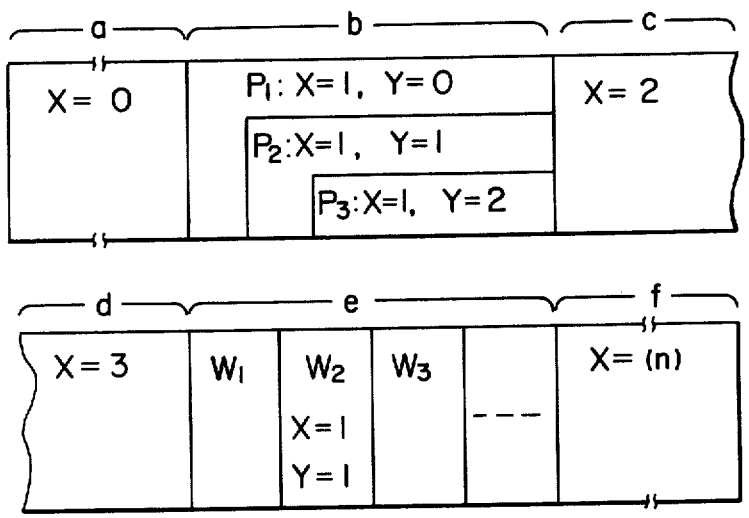
FIG. 4 is a view for illustrating memory protection keys.

FIG. 4 shows a method of allotting protection keys in the present embodiment. As shown, a protection key $X=0$ is given to the subsystem a and $X=1$ is given to the subsystem b. In the subsystem b, an additional protection key $Y=0$ is given to the area $P_1$, $Y=1$ to the area $P_2$ and $Y=2$ to the area $P_3$. Thus, the area $P_1$ has the protection keys $X=1$ and $Y=0$, the area $P_2$ has the keys $X=1$ and $Y=1$, and the area $P_3$ has the keys $X=1$ and $Y=2$. The protection table 1 shown in FIG. 2 stores therein the values of X and Y shown in FIG. 4 at positions indicated by addresses indicating the respective areas.

Figure 3:
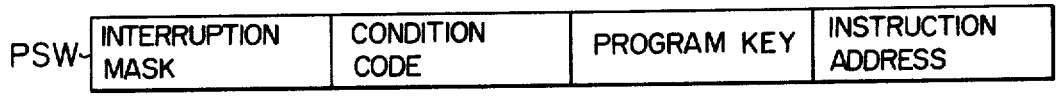
FIG. 3 shows the format of a program status word (PSW)

When a program is executed, a control word called a program status word (PSW) is prepared. An example of the PSW is shown in FIG. 3. The PSW includes, for example, an interruption mask, a condition code, a memory protection key and an instruction address. Upon execution of a program, the program key (P.K.) of the PSW is read out and set in the register 2 of the CPU. Like the keys given to the memory areas, this protection key includes a key X relating to the subsystem and a key Y indicating whether the program is a control program or a user program.

In an arithmatic processor or basic processing unit (BPU) 4, an instruction read out of a memory 3 is stored in an instruction register 5. The operation part of the stored instruction is decoded by a decoder 7 to generate various control signals for controlling the operation of the system. On the other hand, an address register 6 produces an address of the information to be subsequently read out and the address is supplied to the memory 3. The BPU 4 also generates an access request, which is supplied to one input of AND gate 18, so that information is read out from the memory 3 at the given address and is set in the instruction register 5, when a memory access enable signal is supplied from AND gate 18 to memory 3. These explanations show the general operation of the BPU.

Next, the alteration of memory protection information will be explained.

The alteration of memory protection information is necessary in, for example, the following cases. In the first case, a routine used by a certain user program must be stored in the control program area due to a modification of the system. In the second case, a certain user program is allowed to make reference to a subroutine stored in the control program area. In these cases, the reference to such a subroutine from the user program is impossible unless memory protection information is altered.

According to the present invention, when an instruction to be executed is a certain predetermined instruction, memory protection information is altered and the alteration is performed without the aid of a control program, provided the alteration is performed only when an address to be accessed by the instruction is a preset specific one, because it is improper to always allow alteration of memory protection information when a certain instruction, such as branch instruction, is executed.

Figure 5:
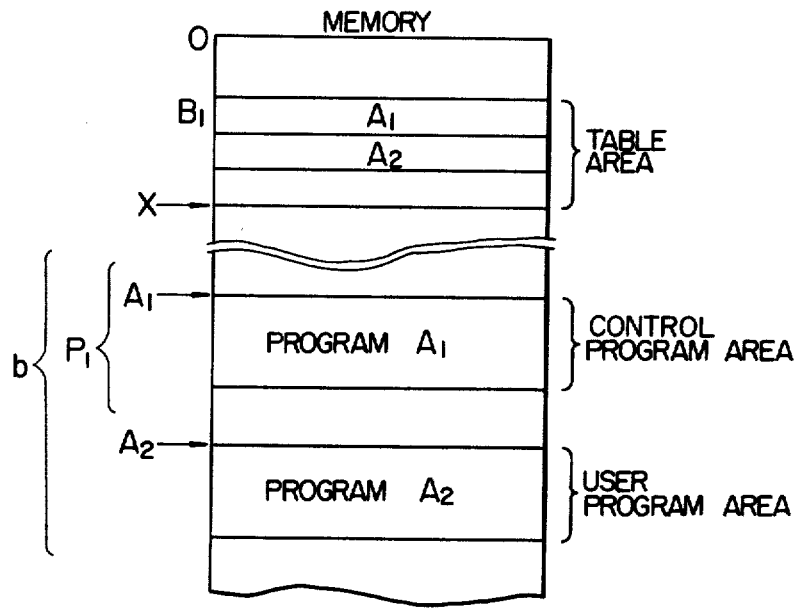
FIG. 5 shows an example of the arrangement of branch address on a memory.

FIG. 5 shows an example of the storage arrangement of a branch address employed in an indirect branch instruction scheme. A branch instruction is read out by the instruction register 5 shown in FIG. 2 while a branch address is formed in the address register 6. In the indirect branch instruction scheme, the address formed in the address register 6 is not a direct branch address but an address indicating a memory area which stores the direct branch address. In the example shown in FIG. 5, the branch address is stored in a memory region above an address X and the actual programs $A_1$ and $A_2$ are stored in a memory region below the address X. If an indirect branch address $B_1$ is formed in the address register 6, a branch address $A_1$ is read into the address register 6 from the memory 3 and the processing turns on the program $A_1$ starting at the address $A_1$.

Now, let us assume that a user program is being processed and the program $A_1$ exists in the control program area.

A control register 27 stores therein the address X in order to allow access of the user program to the control program area in the case where the branch address exists in the table area above the address X. A comparator 8 judges whether or not the address stored in the address register 6 is smaller than the address stored in the control register 27. The comparator 8 supplies a signal to AND gates 9 and 10 when the address of the register 6 is smaller than the address of the register 27. On the other hand, an instruction indicating the branch to a subroutine is supplied from the decoder 7 to the AND gate 9 through a signal line 11. Thus, when the subroutine branch instruction is a branch instruction to the table area involving an address lower than the address X, the AND gate 9 delivers on a line 12 a signal indicating the alteration of protection information.

Now, let us assume that the protection keys shown in FIG. 4 are given to the areas of the memory 3 and the user program stored in the subsystem b is being executed. Then, the X and Y parts of the register 2 are set to "1" and "1" respectively. In this state, access to the area $P_1$ having the protection keys of $X=1$ and $Y=0$ is not possible. However, a protection key $Y=0$ to be given to a control program is stored in a register 13 and is written in the Y part of the register 2 through an AND gate 14 when the signal indicating the alteration of protection information appears on the signal line 12.

A comparator 15 detects whether two inputs thereof coincide with each other or not, and delivers a signal to an AND gate 17 when the coincidence is obtained. A comparator 16 detects whether or not one of two inputs thereof is greater than the other, and delivers a signal to the AND gate 17 when the protection key given for the program is smaller than or equal to the protection key given for the memory. The keys X and Y of the register 2 are supplied to the first inputs of the comparators 15 and 16, respectively. On the other hand, the keys X and Y read out from the protection table 1 on the basis of the address (for example, the address $A_1$ or $A_2$ shown in FIG. 5) in the address register 6 are given to the second inputs of the comparators 15 and 16, respectively. The enabling condition of the AND gate 17 indicates an accessible state, so that an AND gate 18 allows the transmission of the access request generated by the BPU 4, thereby performing access to the memory 3 based the address in the address register 6.

An output 20 from the decoder 7 represents a privileged instruction supplied to the AND gate 10. The output of the AND gate 10 is supplied to AND gates 21 and 22 through a signal line 23. The AND gate 21 is also connected to a register 19 which stores a key X, while the AND gate 22 is also connected to the register 13. Accordingly, the keys X and Y of the register 2 are rewritten or altered by the output signal 23 from the AND gate 10. This operation may be used in other special cases.

With the above construction, even if an erroneous memory access address is formed, at least one of the comparators 15 and 16 will not generate its output signal and therefore both the AND gates 17 and 18 are disabled to inhibit such an access. In the case where the instruction is a particular one and the address for memory access is a specific one, the protection key is altered so that access being otherwise impossible is allowed, that is, though a user program is being processed, the use of a subroutine of a control program from the user program is made possible by altering the protection key to that for the control program.

Figure 6A:
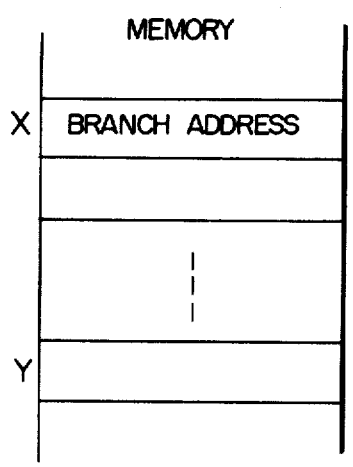
FIG. 6a shows another example of the arrangement of branch address on a memory.
Figure 6B:
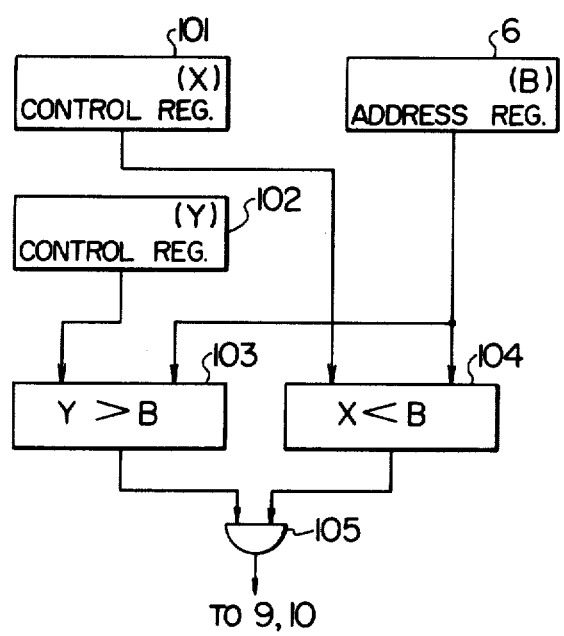

FIG. 6a shows another example of the storage arrangement of a branch address which can be employed in the present invention. In the present example, the address requiring the alteration of protection information lies within a range from an address X to an address Y. FIG. 6b shows a part of a circuit arrangement suitable for the example of FIG. 6a. There are provided two control registers 101 and 102 in which X and Y are set. An address in the address register 6 is represented by B. A comparator 103 detects that B is smaller than Y while a comparator 104 detects that B is greater than X. The outputs of the comparators 103 and 104 are inputted to an AND gate 105 whose output is in turn applied to the AND gates 9 and 10 shown in FIG. 2.

Figure 7A:
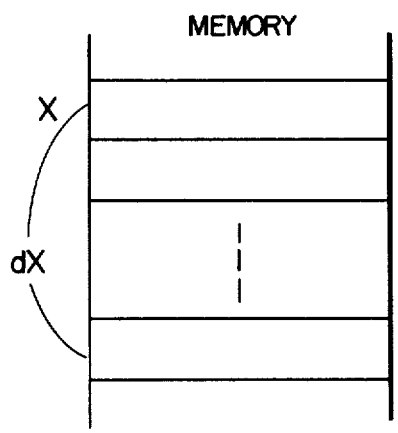
FIG. 7a shows a further example of the arrangement of branch address on a memory.
Figure 7B:
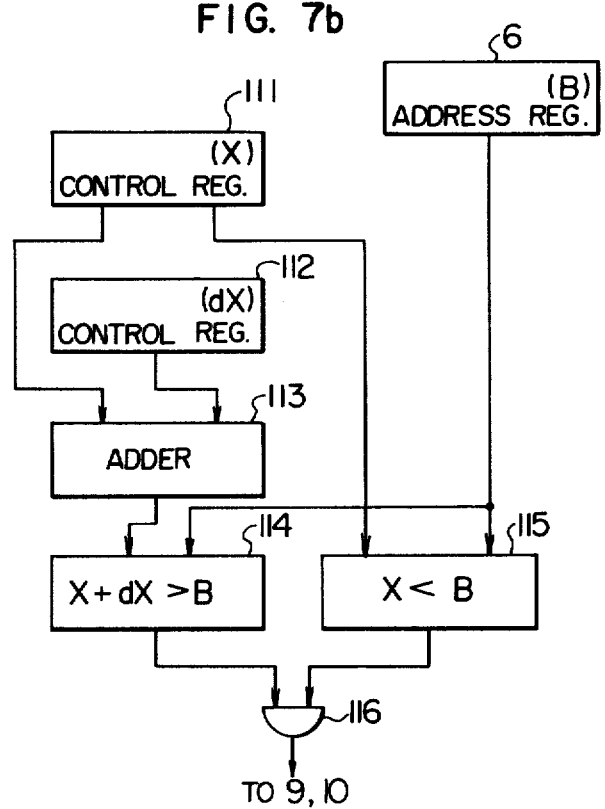

FIG. 7a shows a further example of the storage arrangement, in which the address requiring the alteration of protection information lies within a range from an address X to an address advanced from the address X by an amount dX. FIG. 7b shows a circuit arrangement suitable for this example. The values X and dX are set in control registers 111 and 112, respectively. An adder 113 adds the contents of the registers 111 and 112 to produce X+dX. A comparator 114 detects that B set in the address register 6 is smaller than X+dX, while a comparator 115 detects that B is greater than X. The outputs of the comparators 114 and 115 are inputted to an AND gate 116 whose output is in turn applied to the AND gates 9 and 10 shown in FIG. 2.

Figure 8A:
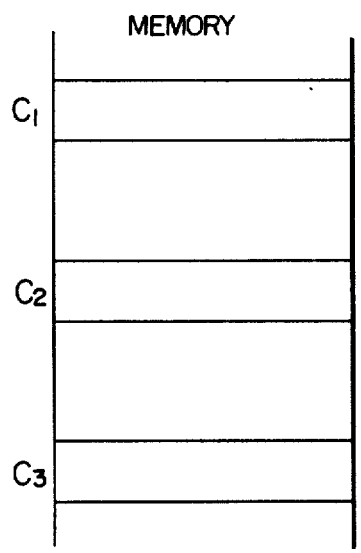
FIG. 8a shows a still further example of the arrangement of branch address on a memory.
Figure 8B:
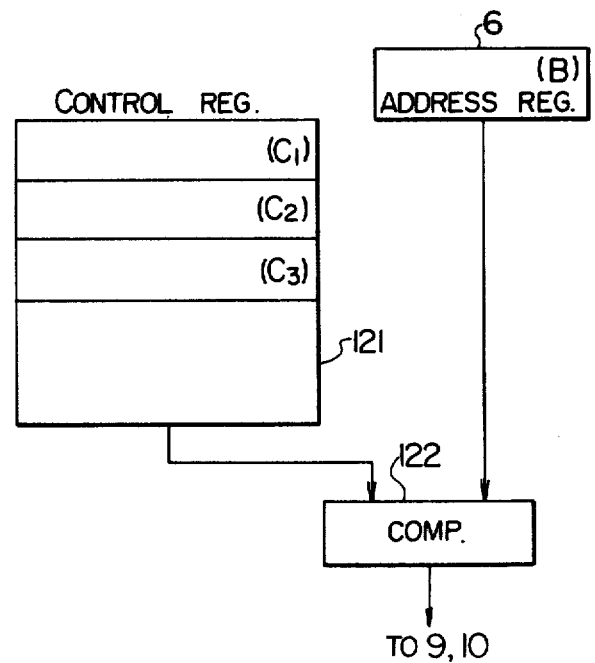

FIG. 8a shows a still further example of the storage arrangement, in which the addresses $C_1$, $C_2$ and $C_3$ requiring the alteration of protection information are distributed at discontinuous positions. In this example, as shown in FIG. 8b, these addresses are stacked in a control register group 121, and a comparator 122 detects whether or not one of the above addresses coincides with the address B set in the address register 6.

The above-mentioned examples of address comparison should be selected as required. It is possible to employ different ones of those address comparison methods in accordance with the kind of the instruction given to the decoder 7.

If a zero address is set as the control address, the alteration of memory protection information is never required in any operation.

As is apparent from the foregoing explanation, the present invention provides the following advantages:

(1) Without a special instruction for the alteration of memory protection information, for example, by merely presetting in the CPU an operation performed by an instruction which can be usually issued on the basis of a user program, the alteration of memory protection information for an area to be accessed can be carried out in association with said operation, thereby avoiding program overhead.

(2) Similarly, when the originally prepared program is operated under a condition of an expanded memory protection function, the alteration of memory protection information can be realized, without any modification of the original program, by presetting in the CPU an operation performed by an instruction capable of being normally issued in the original program.

We claim:

1. A memory protection system for use in a data processing system including a main memory having a plurality of memory areas accessed by respective memory addresses and a program implemented processor for accessing said main memory by application of selected addresses thereto, comprising:
   first storage means for storing therein first predetermined protection information for each of the respective memory areas of said main memory;
   second storage means for storing therein second predetermined protection information for a selected program to be performed by said processor;
   first detecting means for detecting that an instruction to be executed by said processor is a predetermined instruction;
   second detecting means for detecting that an address for access to said main memory specified by said predetermined instruction is a predetermined address;
   determining means connected to said first and second storage means for collating the first protection information stored in said first storage means corresponding to one of the memory areas accessible by an address stored at said predetermined address in said main memory with the second protection information stored in said second storage means, thereby to determine whether the memory access is to be allowed or inhibited; and
   altering means responsive to outputs of said first and second detecting means for altering the second protection information stored in said second storage means, when said first detecting means detects that an instruction to be executed is a predetermined instruction and said second detecting means detects that the address specified by the predetermined instruction is a predetermined address.

2. A memory protection system according to claim 1, wherein said second detecting means includes register means for storing a specific address of a storage area in said main memory and comparator means for detecting whether or not said address specified by said predetermined instruction is smaller than said specific address stored in said register means, said predetermined address being smaller than said specific address.

3. A memory protection system according to claim 1, wherein said second detecting means includes means having first and second registers for storing respectively first and second specific addresses different from each other and comparator means for detecting whether or not said address specified by said predetermined instruction lies between said first and second specific addresses stored in said first and second registers, said predetermined address being located between said first and second specific addresses.

4. A memory protection system according to claim 3, wherein said comparator means includes a first comparator connected to receive said address specified by said predetermined instruction and one of said first and second specific addresses stored in said first and second registers to detect whether or not the former is larger than the latter, and a second comparator connected to receive said address specified by said predetermined instruction and the other of said first and second specific addresses stored in said first and second registers to detect whether or not the former is smaller than the latter.

5. A memory protection system according to claim 1, wherein said second detecting means includes means having a register group for storing a plurality of specific addresses and comparator means for detecting whether or not said address specified by said predetermined instruction is equal to any one of said specific addresses stored in said register group, said predetermined address being any one of said specific addresses.

6. A memory protection system according to claim 1, wherein said second detecting means includes first register means for storing a specific address, second register means for storing a predetermined increment to said specific address, adder means for adding said specific address stored in said first register means and said predetermined increment stored in said second register means to produce an address advanced from said specific address by said predetermined increment, and comparator means for detecting whether or not said address specified by said predetermined instruction lies between said specific address stored in said first register means and said advanced address produced by said adder, said predetermined address being located between said specific address and said advanced address.

7. A memory protection system according to claim 6, wherein said comparator means includes a first comparator connected to receive said address specified by said predetermined instruction and said specific address stored in said first register means to detect whether or not the former is larger than the latter, and a second comparator for receiving said address specified by said predetermined instruction and said advanced address produced by said adder to detect whether or not the former is smaller than the latter.

8. A memory protection system according to claim 1, wherein said altering means includes register means for storing alteration information as third predetermined protection information and means responsive to the outputs of said first and second detecting means for selectively substituting said third predetermined protection information of said register means for the second protection information stored in said second storage means.

9. A memory protection system according to claim 1, wherein each of the first and second protection information stored in said first and second storage means has first and second parts, said determining means including means for detecting that the first parts of the respective first and second protection information to be collated coincide with each other and that a predetermined relation in magnitude exists between the second parts of the respective first and second protection information to be collated, and further comprising means responsive to an output of said determining means for enabling said main memory to effect a memory access thereto by said processor.

10. A memory protection system according to claim 9, wherein the second part of the second protection information stored in said second storage means includes a plurality of types of protection information respectively assigned to a plurality of different kinds of programs for which the extent of the memory areas thereof permitted to effect access to said main memory are different from each other.

11. A memory protection system according to claim 1, wherein said predetermined instruction includes an instruction by which the memory area to be accessed is changed.

12. A memory protection system for use in a data processing system including a main memory with a plurality of subsystem regions each having a plurality of memory areas accessed by respective memory addresses and a program implemented processor for accessing said main memory by application of selected addresses thereto, comprising:

first storage means for storing first predetermined protection information corresponding to each of said subsystem regions and second predetermined protection information corresponding to each of said memory areas;

second storage means for storing third and fourth protection information for a selected program to be executed by said processor, said third protection information being provided corresponding to the subsystem regions, and said fourth protection information being provided in accordance with whether the selected program to be executed by said processor is a control program or a user program;

first detecting means for detecting that an instruction to be executed by said processor is a predetermined instruction;

second detecting means for detecting that an address specified by said predetermined instruction is a predetermined address;

means connected to said first and second storage means for collating the first and second protection information stored in said first storage means corresponding to one of the subsystem regions accessible by an address stored at said predetermined address in said main memory and the third and fourth protection information stored in said second storage means by comparison of the first protection information with the third protection information and the second protection information with the fourth protection information, thereby to determine whether the memory access is allowed or inhibited; and means responsive to outputs of said first and second detecting means for altering the fourth protection information stored in said second storage means.

* * * * *